US012132579B2

(12) United States Patent
Lang et al.

(10) Patent No.: US 12,132,579 B2
(45) Date of Patent: Oct. 29, 2024

(54) METHOD AND APPARATUS FOR PERFORMING AN ACCOUNTING NETWORK LAYER AS A SERVICE

(71) Applicant: AT&T Intellectual Property I, L.P., Atlanta, GA (US)

(72) Inventors: Howard Lang, Wayside, NJ (US); Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/969,167

(22) Filed: Oct. 19, 2022

(65) Prior Publication Data
US 2024/0137234 A1 Apr. 25, 2024
US 2024/0235865 A9 Jul. 11, 2024

(51) Int. Cl.
*H04W 4/00* (2018.01)
*H04L 12/14* (2006.01)

(52) U.S. Cl.
CPC ...... *H04L 12/1407* (2013.01); *H04L 12/1428* (2013.01); *H04L 12/1439* (2013.01); *H04L 12/1457* (2013.01)

(58) Field of Classification Search
CPC ............. H04L 12/1407; H04L 12/1428; H04L 12/1439; H04L 12/1457; H04W 4/24
See application file for complete search history.

(56) References Cited

U.S. PATENT DOCUMENTS

| 10,917,667 | B1* | 2/2021 | Sen ................ | H04N 21/44004 |
| 2012/0208497 | A1* | 8/2012 | Moeller ............... | H04M 15/73 |
| | | | | 455/408 |
| 2013/0054378 | A1* | 2/2013 | Hao ..................... | G06Q 30/04 |
| | | | | 709/224 |
| 2013/0149994 | A1* | 6/2013 | Gaddam .............. | H04M 15/28 |
| | | | | 455/406 |
| 2013/0196615 | A1* | 8/2013 | Zalmanovitch ... | H04M 15/7652 |
| | | | | 455/405 |
| 2014/0094159 | A1* | 4/2014 | Raleigh ................ | H04W 24/02 |
| | | | | 455/418 |
| 2015/0011180 | A1* | 1/2015 | Buonomo ........... | H04L 12/1496 |
| | | | | 455/406 |
| 2015/0304411 | A1* | 10/2015 | Cheng ................. | H04L 67/1061 |
| | | | | 709/203 |
| 2015/0350956 | A1* | 12/2015 | Bell .................... | H04L 12/1435 |
| | | | | 455/405 |
| 2016/0337525 | A1* | 11/2016 | Da Silva .......... | H04M 15/8027 |
| 2018/0309879 | A1* | 10/2018 | Ahmed ................ | H04M 15/09 |
| 2021/0067819 | A1* | 3/2021 | Sen ....................... | H04L 65/612 |
| 2022/0345522 | A1* | 10/2022 | Kolar .................. | H04L 67/1021 |

(Continued)

*Primary Examiner* — Abdelnabi O Musa
(74) *Attorney, Agent, or Firm* — Guntin & Gust, PLC; Dana B. LeMoine

(57) ABSTRACT

Aspects of the subject disclosure may include, for example, a plurality of accounting nodes, each accounting node being associated with a service node of a communication network, each accounting node being configured to collect data usage information for a network segment of the communication network including an associated service node, and an accounting server in data communication with accounting nodes of the plurality of accounting nodes, the accounting server configured to receive from the accounting nodes the data usage information for each service node and determine billing for data usage of each network segment. Other embodiments are disclosed.

20 Claims, 8 Drawing Sheets

(56) References Cited

U.S. PATENT DOCUMENTS

2023/0018772 A1* 1/2023 Kolar ................ H04L 41/0631
2023/0188764 A1* 6/2023 Pahalawatta ......... H04N 19/179
                                                                725/116

* cited by examiner

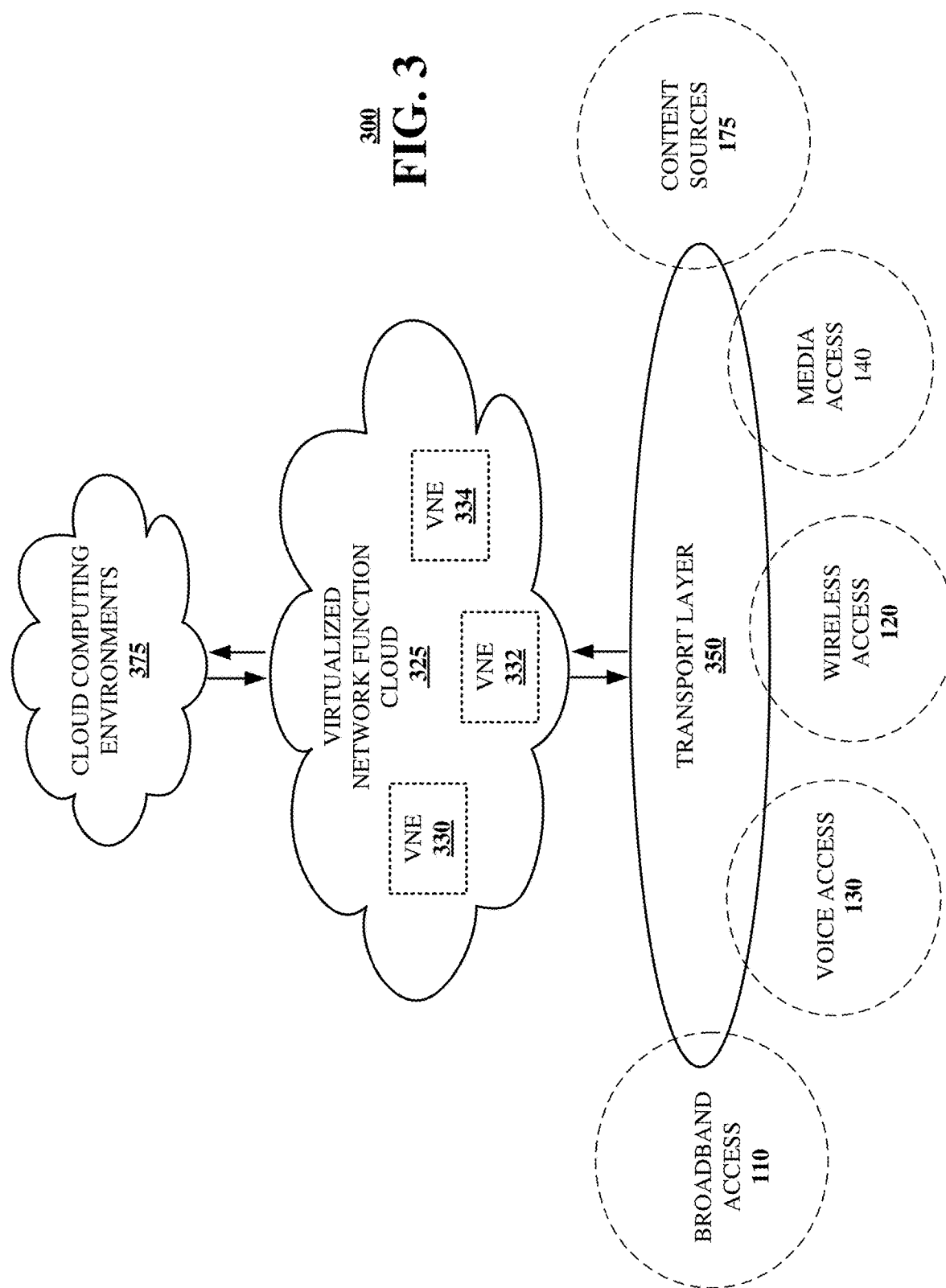

METHOD AND APPARATUS FOR PERFORMING AN ACCOUNTING NETWORK LAYER AS A SERVICE

FIELD OF THE DISCLOSURE

The subject disclosure relates to an accounting network layer established as a service in a mobile communications network.

BACKGROUND

Many services run over the top on cellular networks and the Internet. That is, such services are offered directly to customers via a network such as a cellular, wireless network of the Internet, bypassing cable networks, broadcast networks and satellite delivery. Such services are available or implemented in many locations. A network service such as accounting or billing for subscription service can be difficult to integrate with the traffic of the service on the network.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for separate a network functionality layer such as an accounting layer that is associated with a network service from provision of the network service itself, with hooks or connections between the accounting layer and the service layer. Placing accounting and billing for a service in a separate layer allows a service provider to focus on details of the service layer, logic and traffic. The accounting network layer as a service may then be used for configuring specific service needs and for billing and accounting models. Other embodiments are described in the subject disclosure.

One or more aspects of the subject disclosure include a plurality of accounting nodes, each accounting node being associated with a service node of a communication network, each accounting node being configured to collect data usage information for a network segment of the communication network including an associated service node, and an accounting server in data communication with accounting nodes of the plurality of accounting nodes, the accounting server configured to receive from the accounting nodes the data usage information for each service node and determine billing for data usage of each network segment.

One or more aspects of the subject disclosure include determining, by an accounting node of an accounting network layer, an amount of communicated data communicated by a service node between a designated source and a designated destination, the service node providing communication services in a network segment of a communication network providing data communication between the designated source and the designated destination; providing, by the accounting node, to an accounting server in data communication with the accounting node over the accounting network layer, data usage information for the network segment; and receiving, by the accounting node over the network accounting layer, control information to control routing in the communication network including the network segment, by the service node of data associated with a service in the communication network; and providing, by the accounting node, the control information to the service node to control routing of data by the service node.

One or more aspects of the subject disclosure include receiving network segment data usage information for a plurality of network segments in a communications network, the network segment data usage information collected by accounting nodes associated with respective network segments of the plurality of network segments; receiving accounting information, respective accounting information defining cost factors associated with billing for data usage in a respective network segment, and generating respective billing information for respective network segments according to the network segment data usage information and the respective accounting information.

Figure 1:
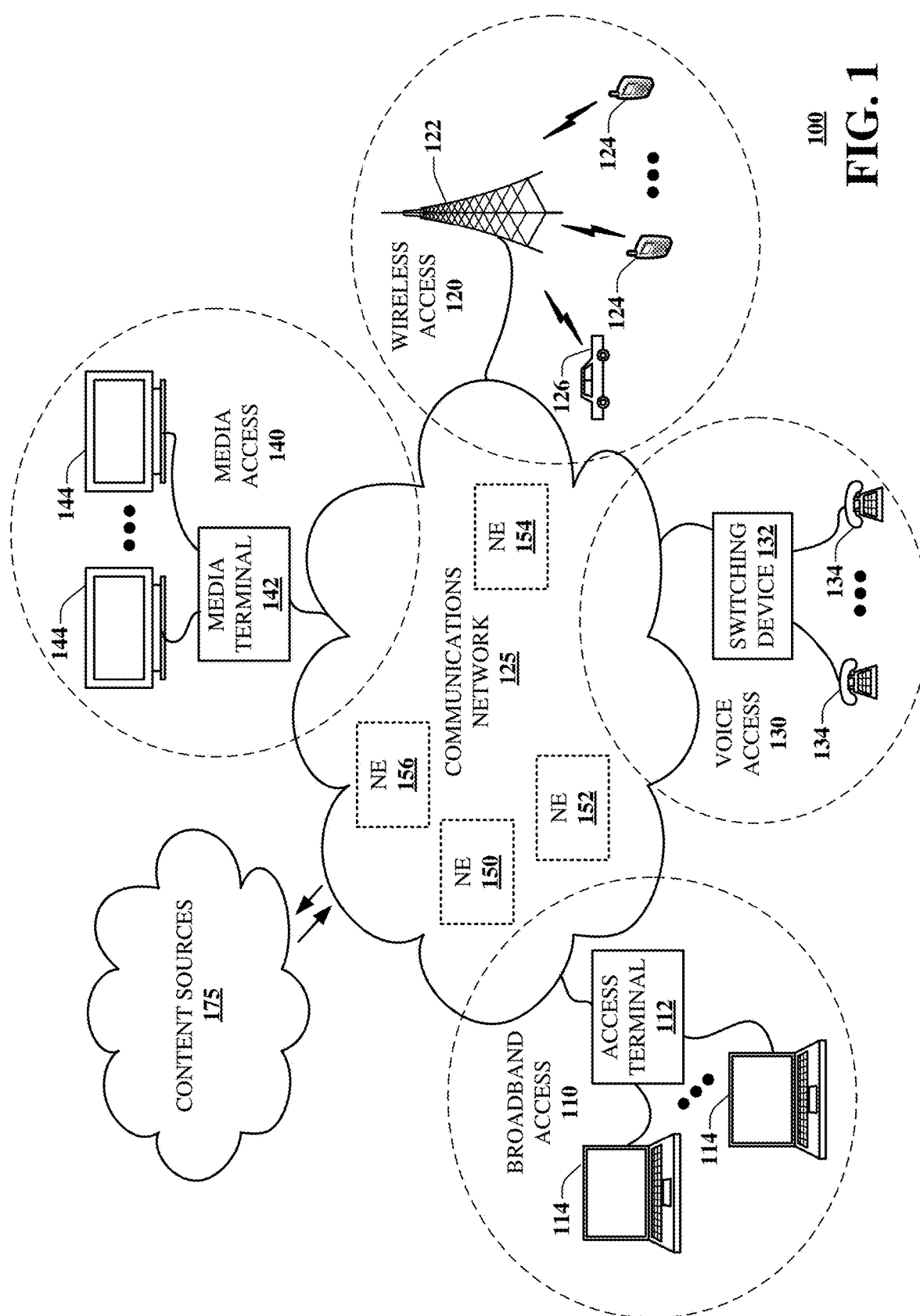
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part in providing an Accounting Network Layer as a Service to track which network segments involved in communication of a service are traversed by data of the service as the service is provided, to allow the operator of those network segments to be compensated therefor. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a fourth generation (4G), fifth generation (5G), or higher generation wireless access network such as a cellular network, a WIMAX network, UltraWideband network, personal area network or other wireless access network, a broadcast satellite network and/or other communications network of any suitable type.

In various embodiments, the access terminal 112 can include a digital subscriber line access multiplexer (DSLAM), cable modem termination system (CMTS), optical line terminal (OLT) and/or other access terminal for providing data communication with facilities of communications network 125. The data terminals 114 can include personal computers, laptop computers, netbook computers, tablet computers or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via a communication standard such as an 802.11 standard including 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, a gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
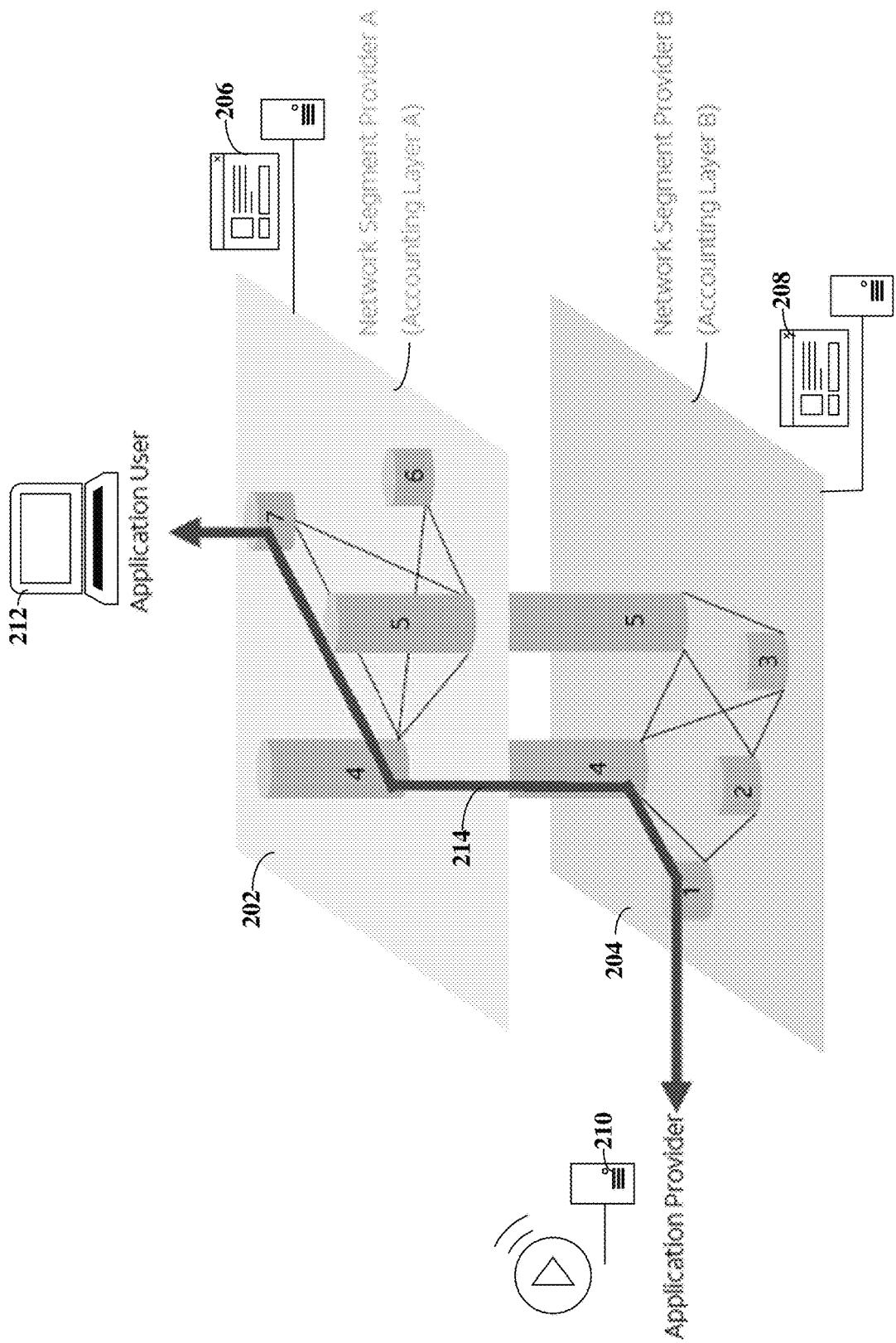
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 illustrates how a network function such as accounting and billing for a network service can be implemented as a service operating independently on a network.

A variety of services have been developed and implemented in various networks such as 4G and 5G cellular networks and the public Internet. Such services include, for example provision of media to an end user, virtual reality or augmented reality services, and online gaming for a user or group of users interacting remotely. Network and service design has focused on connectivity and reliable service provision, usually with great success. Network equipment includes a wide variety of equipment as a transport component for connecting the user with a remote data source for accessing the service. Users in all locations can typically get a good network connection and access the widest variety of services.

One aspect of service provision that has not received as much attention is payment for the services by users. Payment models may vary, but in a typical arrangement, a user is a subscriber who pays for a subscription to the service. For example, the subscriber pays a monthly fee for internet service. The fee paid by the subscriber includes a per subscriber usage fee. The subscription may have a variety of options for accessing the service and the options may be available at a variety of price points. Payment may include detecting how much and what types of services a subscriber accesses and billing the subscriber accordingly, which may be referred to as reconciliation. To date, there has been not good technique for integrating a billing component of a service with the transport component.

Desirably, the accounting and billing aspect of service provision are separated out into layer which has hooks and connections into the service layer. Such hooks and connections may be connected so that there can be appropriate reconciliation later. Making the billing and accounting layer a separate, generic layer has the goal of simplifying the accounting function for a service provider so that the service provider can focus on aspects of service provision such as the service layer and network traffic for the service and logic that provides the service. The service provider can focus on these aspects just as with the accounting layer. The service provider can then use the information from the accounting layer to determine service provision information. Such service provision information may include information such as which particular services are needed and what billing and accounting models might be implemented in order to provide appropriate optimization for the service layer. For example, providing the service may involves tradeoffs between cost and priority and quality of service, or options of billing with certain entities and not with other entities.

Separating out the accounting layer enables the service provider to identify which network segments are traversed in order to provide a given service to a subscriber. Examples of network segments include a fiber optic link, a wireless link, an undersea cable facility or a group of network segments that are owned or operated by the same entity. For example, a broadband network provider seeks to provide media such as steaming video from a media company to an end user. The broadband network provider may connect to a differently owned wireless network provider for the last segment connecting to the end user.

Further, separating out the accounting layer allows the network operator of that identified network segment to be compensated by the service provider of that given service. In the example, the wireless network operator could access the accounting layer and accounting services that are made available to be compensated. Service could be compensated on a per-gigabyte basis or any other suitable basis. In another example, if a subscriber uses a smartphone connected to a cellular network to access an application such as a gaming application on the smartphone, the service provider of the gaming application may identify the cellular network operator and compensate the cellular network operator appropriately. If the user switches from cellular access to accessing the Internet over a broadband cable television network with a Wi-Fi connection to a cable modem, the cable network provider may then be compensated rather than the cellular network operator. In this manner, each different contributor of a segment of the network that enables the end-to-end provision of the service can now be identified and compensated accordingly.

In embodiments, the accounting layer in accordance with various aspects described herein provides a layer that is accessible anywhere and at any time to any billable service. The accounting layer can rapidly provide new, secure network integration. The accounting layer may require minimal configuration and is available both to enterprises and to individuals. The accounting layer can be configured as a long-term service or used for one time.

In exemplary embodiments, the accounting network layer as a service consists of a full mesh network that fully mirrors the service layer. In some embodiments, the accounting functions have a one-to-one mapping with the service functions. In some embodiments, the accounting network layer includes a self-discovery mode to learn topology and function of segments of the service layer of the network. Using the self-discovery mode, the accounting network layer may detect and identify network segments. For example, the accounting network layer may identify a microwave segment, a broadband segment and a wireless segment that may be used to provide a service to one or more end users. The accounting network layer then may mirror the network service segments and mirror those segments, but on the accounting network layer. The network provider may then set fees to be assessed for data traversing the respective segments of the network provider. The operator of the service layer, in turn, can the information about fees and information about network topology to map or otherwise identify topology of the service network. The operator of the service layer may then apply the designated costs or fees to each of the different segments that are in its domain.

Elements of the accounting network layer may be spread over a large geographic area. When operating in the discovery mode, the accounting network layer identifies locations and functions of service nodes of the service network. The accounting network layer further allocates and dedicates respective accounting nodes that may be in the vicinity of service nodes of the service layer. In an example, if the service layer includes a car dealership which has multiple dealership locations across a region, the accounting network layer as a service can ensure that the accounting nodes of the accounting network layer that are close to the dealership locations or branches are activated and dedicated to serve those dealership branches. In this manner, the components of the accounting network layer provide a mechanism to track data usage by the car dealership locations. Then in the aggregate for that entire car dealership enterprise including all its locations, the accounting network layer may determine and track how much data the car dealership locations are using.

In embodiments, all transactions on the service layer are recorded by the accounting network on a ledger system such as the blockchain. For each transaction, the node of the accounting network layer, parties to the transaction, timing, and other relevant information such as what service is being used, the amount of data that was consumed or conveyed across the service network segment, identity information for the requester of the service, identity information for the provider of the service, identity information for owner and operator of a relevant network segment, etc., are recorded in the ledger. The blockchain forms a distributed, secure ledger system.

More detailed information may be used in any suitable information. For example, information about the time of day the service was used in the network segment may be used to vary pricing for the service so that, for example, busier times of relatively higher throughput are priced a higher amount per Gb or cheaper data rates may be applied to off-peak times. Rates and features may be priced to enable customers to obtain what, for them, is the best billing rate. Other features may be priced differently. For example, a higher quality of service (QoS) class indicator (QCI) which gets a higher priority in a cellular network segment may be priced at a higher rate for that network segment. A network segment the provides lower latency may be priced higher to attract customers for applications that require lower latency, such as gaming or virtual reality applications.

In embodiments, service network elements that consume or generate billing and accounting information have a connection link back to a gateway of the accounting network layer as a service. The gateway may operate to collect and consolidate information about transactions at individual nodes. The node and the gateways may be connected over any suitable data communication network.

The accounting network layer may be in data communication with one or more back-end servers. In example embodiments, the backend server may maintain a service profile, information about users, policies such as network policies, accounting and billing policies, requirements, and other information.

In embodiments, the amount of data that's transferred through a network segment is measured for each respective network segment. A cost factor may be applied for each network segment to ensure that the operator of each network segment is properly compensated. The amount of data and cost factor may be used for billing the service provider or other entity and for compensating the operator of the service network.

This information may further be used to help a network planner or service planner to determine the cost of including a particular link of a given network segment when providing a requested service to one or more end users. The information may be combined with other billing information such as a relative priority for the service data, time of day factors, required throughput or latency of other key performance factors. The operation of pricing particular available network segments for providing services to particular users may be done prospectively, before any service is provided. For example, a database may be stored with information in a lookup table or other format for later reference when a service is requested. In another example, the operation of pricing particular available network segments for a selected service to a requesting user may be done substantially in real time, in response to receipt of the request. Such a real time system may be preferable if network availability and function as well as network segment pricing vary dynamically over time.

Referring to FIG. 2A, an exemplary embodiment of a system is shown including two network segments including first network segment 202 and second network segment 204. The first network segment 202 is operated by an organization referred to in the drawing figure as network segment provider A. The second network segment 204 is operated by an organization referred to in the drawing figure as network segment provider B.

The first network segment 202 includes service network nodes providing network functionality for users on the first network segment 202. The first network segment 202 in the example includes four nodes labelled node 4, node 5, node 6, and node 7, respectively. Each node is connected by a network pathway, illustrated as a black line connecting two respective nodes. Each network pathway may provide data communication according to any suitable technology such as wireless or cellular links, broadband connections. microwave connections, undersea cable, and so forth. In an example, the connections between node 1, node 2 and node 3 might include fiber optic links and the connections between node 4 and node 5 might include undersea cable. Any suitable data communication protocol may be used such as internet protocol, Ethernet, and others.

Similarly, the second network segment 204 includes a plurality of service network nodes providing network functionality for users on the second network segment 204. The second network segment 204 in the example includes five nodes labelled node 1, node 2, node 3, node 4, and node 5, respectively. Each node is connected by a network pathway, illustrated as a black line connecting two respective nodes. Each network pathway may provide data communication according to any suitable technology and data communication protocol. In an example, the connections between node 1, node 2 and node 3 might include fiber optic links and the connections between node 4 and node 5 might include undersea cable.

The respective nodes of the first network segment 202 and the second network segment 204 may provide any suitable network functionality. Each respective base station may be a base station including an eNodeB or gNodeB in a cellular network, a network repeater in a broadband or microwave network, a router in a data packet network, etc. The functions of the respective nodes of each network segment may be related to the overall nature and operation of the first network segment 202 and the second network segment 204.

The first network segment 202 includes an accounting network layer, identified in the drawing figure as accounting layer A. Similarly, the second network segment 204 includes an accounting network layer, identified in the drawing figure as accounting layer B. The first network segment 202 accounting network layer, accounting layer A, includes one or more backend servers such as a backend server 206. The second network segment 204 accounting network layer, accounting layer B, includes one or more backend servers such as a backend server 208.

The embodiment of FIG. 2A is intended to be exemplary only. Other embodiments may include any suitable combination of network segments that can be selected and combined to form a data path such as data path 214 between an application provider 210 and application user 212. In an example, the first network segment 202 may be a portion of a nationwide broadband and wireless network and the second network segment 204 may be a rural cooperative telephone network operator. The data path 214 traverses from the application provider 210 to node 1 and node 4 of the second network segment 204 and node 4 and node 7 of the first network segment 202 to the application user 212. In an example, the application provider 210 provides media content such as streaming video such as films and television programming to application user 212 in response to a request from the application user 212. The request is communicated over any combination of network segments including the first network segment 202 and the second network segment 204.

Each network segment provider, including network segment provider A for first network segment 202 and network segment provider B for second network segment 204 may designate one or more nodes as gateways to connect between the respective network segments. In the example, node 4 and node 5 connect between the first network segment 202 and the second network segment 204. Generally, only a subset of one or more nodes of a respective network segment is designated as a gateway for interconnection between network segments.

Thus, the application user 212 wishing to view streaming video from the application provider receives data over the data path 214. The data path 214 includes the application provider 210 to node 1, the node closes to the application provider, and node 4 of the second network segment 204 and node 4 and node 7 of the first network segment 202 to the application user 212. Node 7 of the first network segment 202 is the node closest to the application user 212. In this example, is a gateway that allows connection between the second network segment 204 of the network segment provider B and the first network segment 202 of the network segment provider A. Each of node 1, node 4, and node 7 form the service network or data plane for the data path 214 to convey the data of the streaming video to the application user 212.

In accordance with various aspects described herein, the accounting network layer A and the accounting network layer B include accounting nodes instantiated with or near each service node, node 1, node 4 and node 7. Each of the service nodes, node 1, node 4 and node 7, has an associated accounting node in this example. Other nodes in the first network segment 202 and the second network segment 204 may also include instantiations of accounting nodes. The accounting nodes may include any suitable components of hardware and software. In alternative embodiments, each network segment has associated therewith an accounting node. In such embodiments, the accounting node operates to determine an amount of data passing through the network segment or conveyed by the network segment from one node to another.

Each respective accounting node operates to measure an amount of data passing through the associated service node. Any suitable data measurement technique may be used by an accounting node to account for the amount of data passing through a service node. The measured data amounts may be associated with any suitable related information such as time stamp information, identification information for the application user 210, identification information for the application user 212, and identification information for the application. The measured data amounts, along with the related information, may be combined as data measurement information.

Also, in accordance with various aspects described herein, data measurement information for node 4 and node 7 may be conveyed by the accounting network layer A of the first network segment 202 to the backend server 206. Similarly, data measurement information for node 1 and node 4 may be conveyed by the accounting network layer B of the second network segment 204 to the backend server 208. The backend server 206 and the backend server 208 receive the data measurement information and determine, alone, together or in combination with other data processing systems, which entity will be billed and what amount will be billed. The amount will be based on the amount of data conveyed by a network segment and by various data rate information.

A gateway node, such as node 4 and node 5, are not instantiated for each node in a network segment. In a typical embodiment, there are one gateway or a small subset of gateways for each network segment provider, such as network segment provider A and network segment provider in the example embodiment of FIG. 2A.

The accounting network layer A and the accounting network layer B include one or more nodes such as the gateway node 4 and the gateway node 5 in data communication with the backend server 206 and backend server 208, respectively. The accounting network layer A and the accounting network layer B form low speed telemetry networks for the data measurement information coming from gateway node 4 and gateway node 5. The data measurement information is usage-based data. The accounting network layer A and the accounting network layer B provide usage-based monitoring which identifies a node such as node 4 which received data and routed an amount of data, such as 5 gigabytes worth of data, over to node 7. Based on that data measurement information, for node 4 to node 7, data usage for the network segment from node 4 to node 7 should be recorded as 5Gb of network usage. Further, the data usage may be attributed to a particular application user and also to a particular application provider, for example.

Figure 2B:
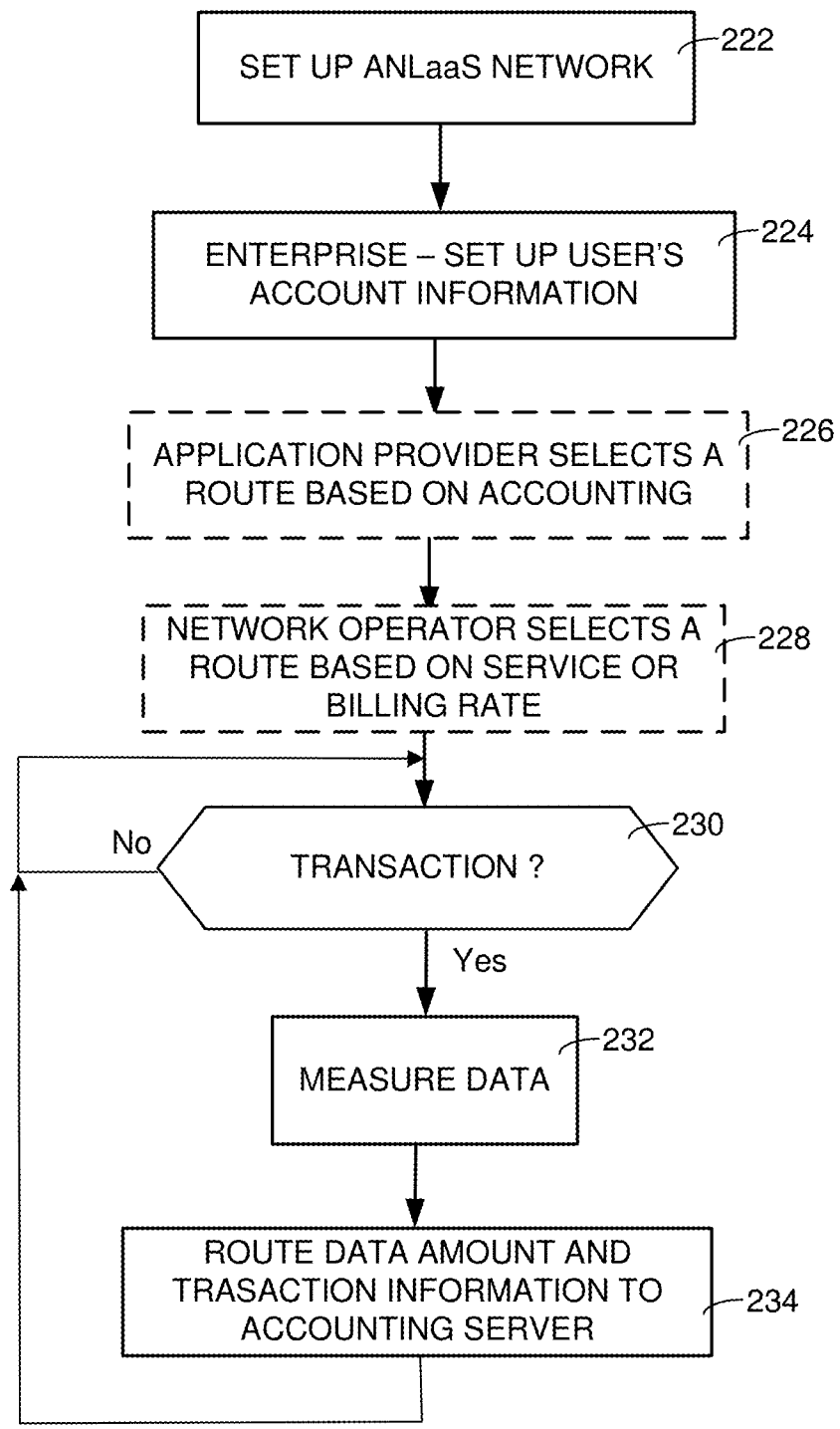
FIG. 2B depicts an illustrative embodiment of a method in accordance with various aspects described herein.

FIG. 2B depicts an illustrative embodiment of a method 220 in accordance with various aspects described herein. In the embodiment shown and modifications thereof, the method 220 may be used to set up an accounting network layer as a service (ANLaaS) and use the ANLaaS for monitoring and collecting usage data for one or more network segments in a service network and for accounting and billing functions related to that data usage. One or more network operators operate network components and infrastructure, such as wireless equipment, fiber optic equipment, satellite equipment, long-haul communications equipment and other elements of a communications network such as communications network 125 of FIG. 1. The communications network may include a number of network segments which may operate independently and may operate using different data communication technologies and may be owned and operated by different network operators. Data may be communicated from a data source to a data sink over any suitable combination of network segments. Each network segment may be termed a service network and each service network has any number of nodes or service nodes where data is sourced or sunk. For example, service nodes may include switches or gateways between network segments. Some service nodes also serve as gateways or gateway nodes. Gateways connect one data segment to another to provide data communication among the network segments.

At step 222, the ANLaaS network is set up. The ANLaaS includes a plurality of accounting nodes, a data communication network and at least one accounting server. The ANLaaS generally has knowledge about nodes and connections of the service network segment with which it is associated. The ANLaaS may be set up to mirror the service network. Each accounting node is generally set up near or at a service node of a network segment. In some embodiments, each accounting node stores accounting information for the network segment. In other embodiments, each respective accounting node operates to exchange control information with the service node and to measure an amount of data passing through the associated service node. Any suitable data measurement technique may be used by an accounting node to account for the amount of data passing through a service node. The measured data amounts may be combined with or associated with any suitable related information about a transaction. Transaction information may include date or information such as time stamp information marking the time of a transaction or communication of data through a network segment, identification information for an application whose data is communicated through a network segment, identification information for an application provider associated with the application, identification information for an application user associated with the application. Any other suitable information related to usage of data or communication of data through a network segment may be included with the transaction information. The measured data amounts, along with the transaction information, may be combined as data measurement information.

The accounting measures and collects the measured data information and the transaction information and communicates this information as data measurement information to an accounting server. In various embodiments, each network segment includes an accounting server and the accounting server is in data communication with the accounting nodes over an accounting network. The accounting network may include any suitable data communication technology and equipment. In some embodiments, some or all of the accounting network may include elements such as switches or routers or other infrastructure of the network segment whose data usage is being measured by the ANLaaS. In general, the account network need not offer particularly high data rates or data throughput. Relatively small amounts of data measurement information are communicated by the accounting network and key performance indicators such as latency and throughput are generally not important to this data.

The accounting server collects the data measurement information from the accounting nodes communicated over the accounting network. Any suitable data communication protocol, or combination of data communication protocols, including error detection and correction, may be used to communicate the data measurement information. Data measurement information may be communicated according to any suitable schedule including daily, weekly, or immediately upon communication of the service data through the network segment. Some portions of the data measurement may be sorted or organized for convenience or other reasons. For example, all data associated with a particular application may be combined by the accounting node and transmitted to the accounting server together. In another example, all data associated with an application provider or an application user may be combined by the accounting node and transmitted to the accounting server together.

The accounting server, such as backend server 206 or backend server 208 of FIG. 2A, combines the data measurement information with other accounting information to generate billing information. The billing information forms an indication of an amount owed to the network provider associated with the network segment over which the data measurement information is communicated. The accounting server may have access to accounting information such as data rate information to be charged by the network operator for usage of a network segment, for an application, for an application provider or an application user. The accounting information may include information about discounts or premiums to be charged by the network operator. The accounting information may include information about who is to be charged for a particular usage of the network segment.

Whether the application provider or the application user, a combination of them, or another party, gets billed by the network provider is a business decision of the network provider. In step 222 of FIG. 2B, accounting network infrastructure such as the accounting network layer A, the accounting network layer B, the backend server 206 and the backend server 208 of FIG. 2B, are installed and operate as infrastructure to collect data usage information and perform the essentials of accounting for data usage.

The network operator, or the network operator network segment provider A and network segment provider B, can make the billing decision over whom to bill for data usage. In one example, the network operator can decide to split costs of data communication through the network segment between the application provider and the application user. In another example, a network operator operates an emergency network exclusively for first responders for emergencies. In such an emergency network, the users of the emergency network require high priority and high quality of service. If the network operator has communication links offering a range of priority and quality of service, the network operator may choose to route the emergency network traffic over communication links offering high or highest priority as well as high or highest quality. The network operator may bill the emergency network services at a premium rate for the first responders. In another example, the network segment may carry data for an inexpensive prepaid service accessible by users. Users of the prepaid service are primarily motivated by cost and not motivated by quality of service or other factors. In that example, the network provider may choose to route the prepaid service over network segments offering lower quality and to offer a reduced data usage billing rate.

The accounting network layer forms the infrastructure so that all of the necessary data for billing is available. The gateway nodes provide the usage information including the time of day. The backend server, accounting server or another network component has every other cost factor available or may receive billing information from any suitable source. With this information, the network operator can bill using whatever billing rules the network operator chooses to use. The system 200 of FIG. 2A and associated methods such as method 220 operate to measure and track network usage information and pull that information back through the accounting network layer to an accounting system including the backend server 206 and the backend server 208. The accounting system operates to bill parties for usage of the network segment, factoring in not only usage but other billing information such as types of parameters that may be billing related or may be a factor in determining what the charge to the parties may be, such as time of day. The gateway nodes, the accounting layer and the backend server form a layer that is opened up into the accounting system. The accounting layer allows the network provider to determine how much and who should be billed for use of the network segment.

If different network segments such as the first network segment 202 and second network segment 204 of FIG. 2A are operated by different network operators, each network operator may operate their own respective accounting network layer. The different network operators may put in place reciprocal arrangements to carry each other's traffic and to bill for usage appropriately. At the end of a billing period, such as each month, the different network operators may reconcile their accounts to account for usage of the others network facilities. Each network operator may implement different rate structures for different services or different customers or different technologies such as cellular, broadband or microwave communications. The network operator may offer wholesale data rates or rates based on amount of data usage. The network operator may offer contractual rates for a period of time.

The reciprocal arrangements among the different network operators may provide for sharing more detailed or less detailed information about network usage collected by a first network operator with a second network operator. This may include detailed records with data about instances of data usage, time of day, application provider, application user, etc. Or, a network operator may provide more limited information, again as a business decision.

In another embodiment, a single accounting provider may manage accounting information and may collect and disburse fees for network usage. In one example, each accounting server such as backend server including backend server 206 of network segment provider A and backend server 208 of network segment provider B, could provide to a third-party accounting provider information about network usage collected by gateway nodes and information about cost factors, billing rates and other information that forms the accounting information of each network operator. In an embodiment, this accounting information may be written to a public blockchain and processed for billing purposes.

In some embodiments, application providers and applications users are generically considered enterprises. Each enterprise may form a node of the service network. Each enterprise may access a network provider to provide data communication services and, in association with the data communication services, to provide accounting network layer as a service (ANLaaS). The ANLaaS may be provided as a service by the network operator to network subscribers. In step 222 of FIG. 2B, based on subscription information and other information provided by the subscribers, the network operator through the ANLaaS may map out all network points or nodes associated with ANLaaS subscribers and network connections between network nodes. Such network nodes may include individual users, network nodes, points of sale, taxation jurisdiction information, banks and other enterprises that may make use of the ANLaaS. Information about network connections may include information about nodes connected to a connection, communication technology used for data communication such as fiber optics, 4G and 5G wireless, etc. Any suitable mapping technique, including commercial network mapping services, may be used. Such mapping information may be combined with ANLaaS intelligence to differentiate point of sales and headquarter locations or for peer-to-peer individual users.

In step 224, each enterprise establishes account information for the enterprise or for a user operating within the enterprise. In an example, each enterprise using the ANLaaS designates an administrator for the enterprise. The administrator defines one or more accounting rules for the enterprise or for particular users within the enterprise. In an example, such rules could include defining which user can deposit amounts to a bank account and which users can both deposit and withdraw amounts from the bank account. The accounting rules may be general in nature or may be tailored to a specific enterprise or user, or to the user's role within the enterprise. The accounting rules may further be related to usage of an application by users within the enterprise. For example, an application which is offered over a service network by an application provider such as a database management program might have controlled usage within the enterprise. The accounting rules specify users entitled to access the database management program and how usage, including data communication over network segments between the enterprise and the application provider, may be accounted for and billed.

In a further example, step 224 may include defining a token that may be used to specify information about an enterprise or rights and responsibilities related to data usage by the enterprise. In this example, each individual network point or network node employs a software application associated with the enterprise via a token that ties the individual user or network node with the enterprise. The token may be in any suitable format such as a portion of code or unique data stored in a computing device of the enterprise. The token defines all limitations, privileges and functionalities of each enterprise accessing the ANLaaS. Every time a transaction occurs, the token will cause billing and accounting information to be routed onto the ANLaaS network for the destination and functionality specified by the token.

This operation thus presents a way for the enterprise to pay for data usage in a network segment using the ANLaaS. The enterprise may be an application provider such as a media provider of streaming video. Or the enterprise may be an end user or application user consuming the streaming video. The ANLaaS can be very flexible so that, for any given service or data usage, there is a mechanism to enable compensation for data usage.

Use of a token or other similar identifying information for an enterprise allows access control to manage access to the service. Each node of the service nodes of a data network, such as node 1, node 2, node 3, node 4, node 5, node 6 and node 7 of FIG. 2A, may include a software application that monitors transactions that that should be reported to the ANLaaS. When such a transaction occurs, the node communicates telemetry information such as a reporting message including the token and relevant information about the transaction to an accounting node or backend server such as backend server 206 or backend server 208.

In embodiments, the token may include all necessary identification information such as account identifiers and user identifiers. The token further includes information defining privileges and limitations imposed on the enterprise, either by another party on the ANLaaS or by the network operator. For example, the token used by a depositor to access data of the depositor at a bank over the network segment may define actions the depositor is allowed to take, including deposit of amounts in a specified account and withdrawal of amounts in a specified account. The information about privileges and limitations as well as the account identifying information, may be contained in the token.

Step 226 and step 228 may be optionally included in some embodiments, as indicated by the dashed lines. In step 226, an application provider may select one or more routes through the service network to application users based on accounting principles or billing factors. One exemplary billing factor is reducing or minimizing the cost of data consumed or conveyed across the network segment. For example, for particular traffic in a network segment, the application provider may select a route based on using lowest cost or lowest latency or highest reliability, or any other key performance indicator or accounting parameter. Such a selection would help provide an appropriate quality of service treatment for the data within the network, based on billing optimization. In some current networks, a user can designate different types of traffic with different types of quality-of-service indicators. However, such a quality-of-service indicator is not based on accounting or billing factors.

In an example, the application provider may indicate to the network provider to always pick whatever the lowest-cost routing happens to be, or always pick the lowest-latency route for a specified packet of data. This may permit the application provider to dynamically select a preferred way of routing the traffic through the network based on billing considerations.

While FIG. 2B indicates that an application provider may select a route based on accounting considerations, this ability may be extended to any data source or data sink in the network. For example, a business such as a bank with many locations on the network that communicate a mix of high-priority data, such as stock quotes, and low priority data such as email and personal messaging, may specify a data handling priority or routing based on reducing an overall cost of data usage on the network. The email and messaging may be routed in a low-cost manner. The stock quotes may be routed in a highest cost manner.

A data handling and accounting indication may be given in any suitable manner. For example, each packet of data communicated by an application provider may include a header and a payload. The header includes various control information including addressing. One or more fields of the control information may be defined by the network operator for specifying a data handling and accounting indication for the packet. A number of predetermined values may be established, such as highest cost, highest priority; lowest cost, lowest priority; and medium cost, low priority. Any suitable scheme may be used to designate packet handling for accounting purposes. In other examples, rather than specify data handling according to accounting requirements at the packet level, any other suitable technique may be used such as designating a specific network destination address or designating a level of accounting service (LoAS) indicator for a particular data stream.

In other embodiments, the ANLaaS provides the network routing information to the service network. For example, an application user may specify to the ANLaaS accounting server that the application user only wants the least expensive network routing in all cases. This may be done, for example, by accessing a user interface provided by the accounting server to the application user for such purpose. Based on this specification by the application user, the accounting server may communicate over the accounting network to accounting nodes how data addressed to and from the application user should be handled. Each accounting node, in turn, may specify to an associated server node how the data for the application user is to be handled. In this manner, one of the parties can provide financial direction on how traffic should be routed to accomplish a particular accounting goal.

In optional step 228, the network operator may select a route through the network based on any suitable factors including accounting considerations. Some technical considerations may include the service being requested by an enterprise. In an example, a service such as streaming live video may be given a relatively high priority. Some accounting considerations may include a billing rate or volume discount, or time of day discount or premium offered by the network operator to an enterprise such as an application provider. In one example, if a user such as an application provider requests data transport through a jurisdiction which does not tax such activity, the network operator may have access to multiple routes that meet that requirement. The network operator may then select an appropriate route based on other considerations such as existing or anticipated traffic levels or network availability.

At step 230, the method 220 determines if a transaction has occurred. In embodiments, a transaction may be defined very broadly to include any activity that involves transport of data over a network segment. If no transaction is detected, operation of the method 220 may remain in a loop including step 230 until a transaction is detected.

If a transaction is identified, at step 232, an amount of data transmitted by a network segment due to the transaction is measured. Any suitable method may be used for measuring an amount of data communicated. In one example, an accounting node of the ANLaaS and associated with a service node in a service network communicates with the service node to prompt the service node to provide data to the accounting node about packets communicated by the service node that fit a description. The description may specify a source address of the packets and a destination address of the packets, or any other information such as an application provider or application user. In another example, the accounting node may collect from the service node all information about packets communicated by the service node to all destinations. The accounting node may then process the packet data and sort the packet data in any suitable manner, such as by application name, application provider, application user, etc. The data may be further processed, such as based on time stamp information, to determine an amount of data transmitted by the service node in a network segment.

At step 234, the method 220 includes routing information by the accounting node of the ANLaaS about the data amount determined at step 232, along with any related transaction information to an accounting server of the ANLaaS. The related information may include any information pertinent to accounting for the data usage in the network segment. This may include, in some embodiments, time stamp information, identification information for the application provider or the application user, etc.

In some embodiments, generally, every time a transaction occurs that includes a network segment covered by the ANLaaS, a token or a copy of a token is transmitted with billing and accounting information to the ANLaaS layer. The ANLaaS layer includes or connects to a processing system such as backend server 206 or backend server 208 in FIG. 2A an appropriate account adjustment is performed. The result may be a debit to the ledger of one party, a credit to the ledger of another party, or any suitable combination.

Figure 2C:
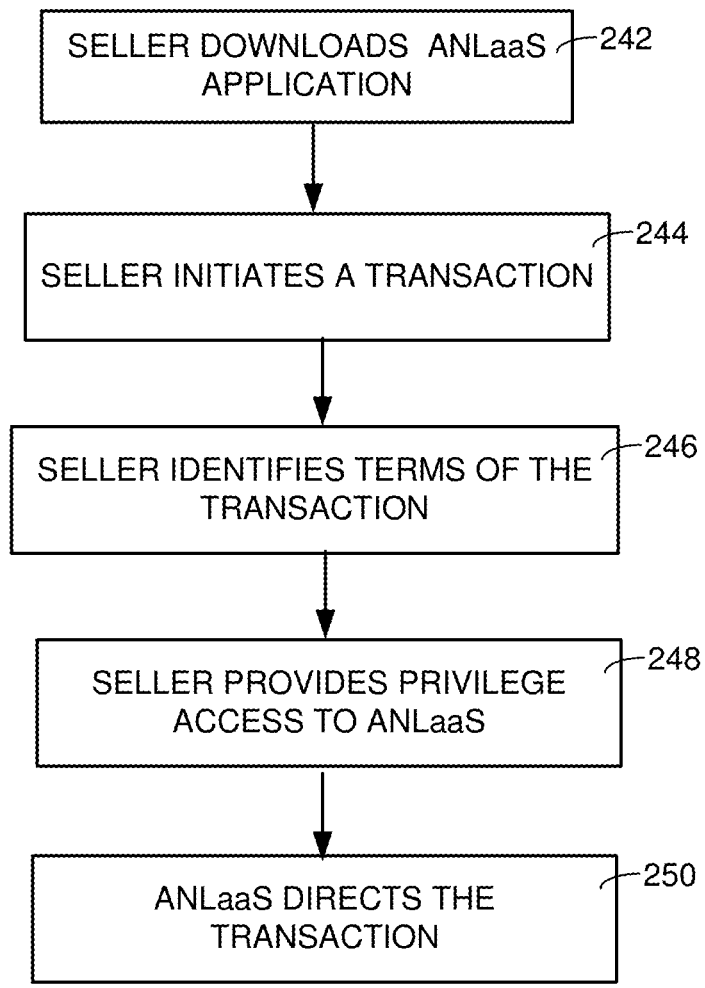
FIG. 2C depicts an illustrative embodiment of a method in accordance with various aspects described herein.

FIG. 2C depicts an illustrative embodiment of a method 240 in accordance with various aspects described herein. In the example embodiment of FIG. 2C, the ANLaaS may be used for peer-to-peer transactions. In an example, a first user owes compensation to a second user. For example, the second user sold a good or service to the first user for agreed-upon compensation and must convey the compensation amount to the second user.

At step 232, the method 240 includes a seller of a good or service downloading or otherwise accessing an accounting network layer as a service (ANLaaS) application to a device of the seller. The device may be a mobile device such as a smartphone or tablet computer, a laptop computer or any other suitable data processing system. In the example, the ANLaaS application is intended for use by an individual rather than by an enterprise. The individual-use application may include fewer features than an enterprise application or may be available for a different cost structure than the enterprise application. In some examples, rather than use an ANLaaS application on a user device, the user may access an online version of the ANLaaS service at a website or other network resource. In other examples, a buyer of a good or service or any other participant in a transaction may access the ANLaaS application or service.

At step 244, the seller initiates a transaction using the ANLaaS application. In one example, the seller identifies the nature of the good or service to be sold and the other party to the transaction. In an example, the seller seeks to sell a non-fungible token (NFT) to a buyer. In one embodiment, the ANLaaS application cooperates with the accounting server to set up the transaction including terms and privileges. Data is communicated over the accounting network that mirrors a data provider's service network and provides data communication between accounting nodes of the ANLaaS and the accounting server of the ANLaaS. The data communication may be encrypted to provide secure communication among elements of the ANLaaS.

At step 246, the seller identifies other terms of the transaction using the ANLaaS application. For this example, the seller may specify a destination crypto wallet to receive the NFT and a destination for compensation to be paid by the buyer.

At step 248, the seller provides privilege access to the crypto wallet for the transaction using the ANLaaS application. The accounting server may operate to access the crypto wallet at its network location and to access an account of the buyer to retrieve designated funds.

At step 250, the ANLaaS directs the transaction according to the specified terms. Step 250 is completed using facilities of the accounting network layer.

Thus, the method 240 of FIG. 2C provides a secure method of completing a transaction between parties. Rather than paying a seller through a bank or other service, the buyer pays the seller through the ANLaaS network. The transaction may only be completed through two designated peers. Some available payment services may allow a user to specify a recipient of funds, but the wrong recipient may be inadvertently named. In the example of FIG. 2C, the parties can proactively set up the transaction so that only the designated recipient may receive the funds that are the subject of the transaction.

The ANLaaS and related systems can be extended to other examples as well. For example, a decentralized communication network may include one or more ad hoc placements of communication equipment such as radio access points. The decentralized network is different from a centralized network in that development and configuration of the centralized network is generally carefully planned to provide good network coverage in areas designated for service. In a decentralized network, though, planning is less regular. Small-cell providers or neutral cell providers may be one party of a number of parties, both public and private, to use the same network. The network may be managed by a third party managed services provider or other. In embodiments, private mobile and devices of public mobile network operator may access the private, decentralized network. In turn, the private decentralized network may link data to a network of a public Mobile Network Operator (MNO).

The neutral host operating on such a decentralized network deploys the neutral host's network nodes in order to be compensated according to a business model. Every time a packet of data or a gigabyte of data passes through the neutral cell node of a neutral cell host, the neutral cell host should be compensated. The respective amounts charged by respective neutral hosts for similar communication service may not be the same.

The ANLaaS may be useful for tracking data usage in such a decentralized network. The accounting network layer in embodiments may track traffic and activities in the decentralized network including in network segments including a neutral host. For example, the ANLaaS can identify and track connections between a mobile handset and a set of neutral hosts. Further the ANLaaS can identify and track data communications between a neutral host and a public mobile network operator (MNO) operating a mobility network. The ANLaaS may thus enable this identifying and tracking to ensure that proper accounting is maintained. The ANLaaS may store accounting information such as fees assessed, discounts, premium changes, for each neutral host and for each business relationship between a neutral host and an MNO. The ANLaaS can track how much data traversed each neutral host and therefore how much each neutral host should earn.

A unique feature of this arrangement is that a connection from a mobile handset to a serving cell is not just based on key performance indicators such as a strongest received signal strength or lowest latency. The selection of a connection to serve the mobile handset is also based on financial considerations as well. In an example, a mobile handset is in a coverage area served by two or more neutral host cells as well as a macrocell of an MNO. In this case, technological considerations such as key performance indicators are mixed with financial considerations such as relative cost per gigabyte of each network connection possibility. The decision becomes, at least in part, a business decision or a financial decision. In an example, if the MNO macrocell is currently operating at full capacity, then connecting the mobile handset to a neutral host may be most cost effective. Similarly, if the MNO macrocell is operating at ten percent capacity, it may be preferable connect to the mobile handset with the MNO macrocell to avoid the charges associated with the neutral host. The decision may change if the mobile handset belongs to a first responder operating on an emergency, high priority network or an occasional user operating on a prepaid plan or accessing a prepaid application. Using information from the ANLaaS, the MNO operator knows the relative cost of each available link for the mobile handset. Further, the MNO has information about time of day, location, the nature of the customer associated with the mobile handset and other information that may inform the decision to connect to the mobile handset. The decision can be based in part on financial considerations because of the availability of cost and accounting information from the ANLaaS. Because the MNO has access to information from the accounting layer which allows the MNO to do both billing and control, the MNO may assess business criteria and make such criteria a factor in how the service is provided to users.

In another example, the ANLaaS may enable improvement or optimization of costs for an application provider who provides access to an application to users over a combination of network segments. In this example, the ANLaaS can provide information about the cost of available network segments. Understanding the relative costs of routing through various networks can allow the application provider to steer connections through the lowest cost network connections, where cost is a primary concern. In an example, the application provider provides streaming media to viewers. For that application, latency is not a crucial issue, and the application provider may select a network that provides a lower cost albeit at slightly higher latency. In contrast, if the application provider provides an interactive gaming application, latency seen by gamers and gaming equipment is a crucial issue. Therefore, the application provider with access to information from ANLaaS may choose a network route the provides low latency but does so at a relatively lower cost.

While for purposes of simplicity of explanation, the respective processes are shown and described as a series of blocks in FIG. 2B and FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 220 and method 240 presented in FIG. 1, FIG. 2A, FIG. 2B, FIGS. 2C, and 3. For example, virtualized communication network 300 can facilitate in whole or in part in providing an ANLaaS to track which network segments involved in communication of a service are traversed by data of the service as the service is provided, to allow the operator of those network segments to be compensated therefor.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
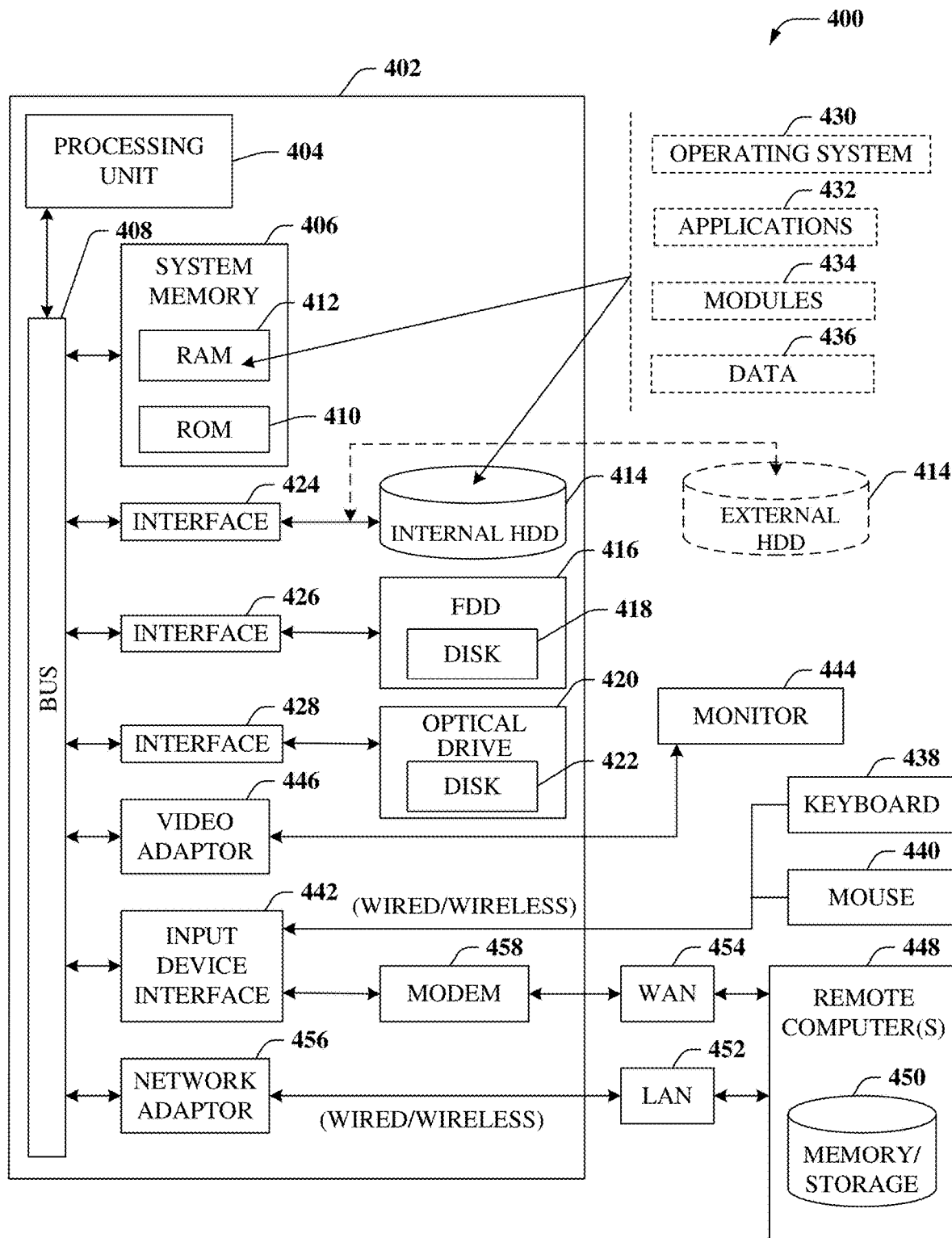
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part in providing an ANLaaS to track which network segments involved in communication of a service are traversed by data of the service as the service is provided, to allow the operator of those network segments to be compensated therefor.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
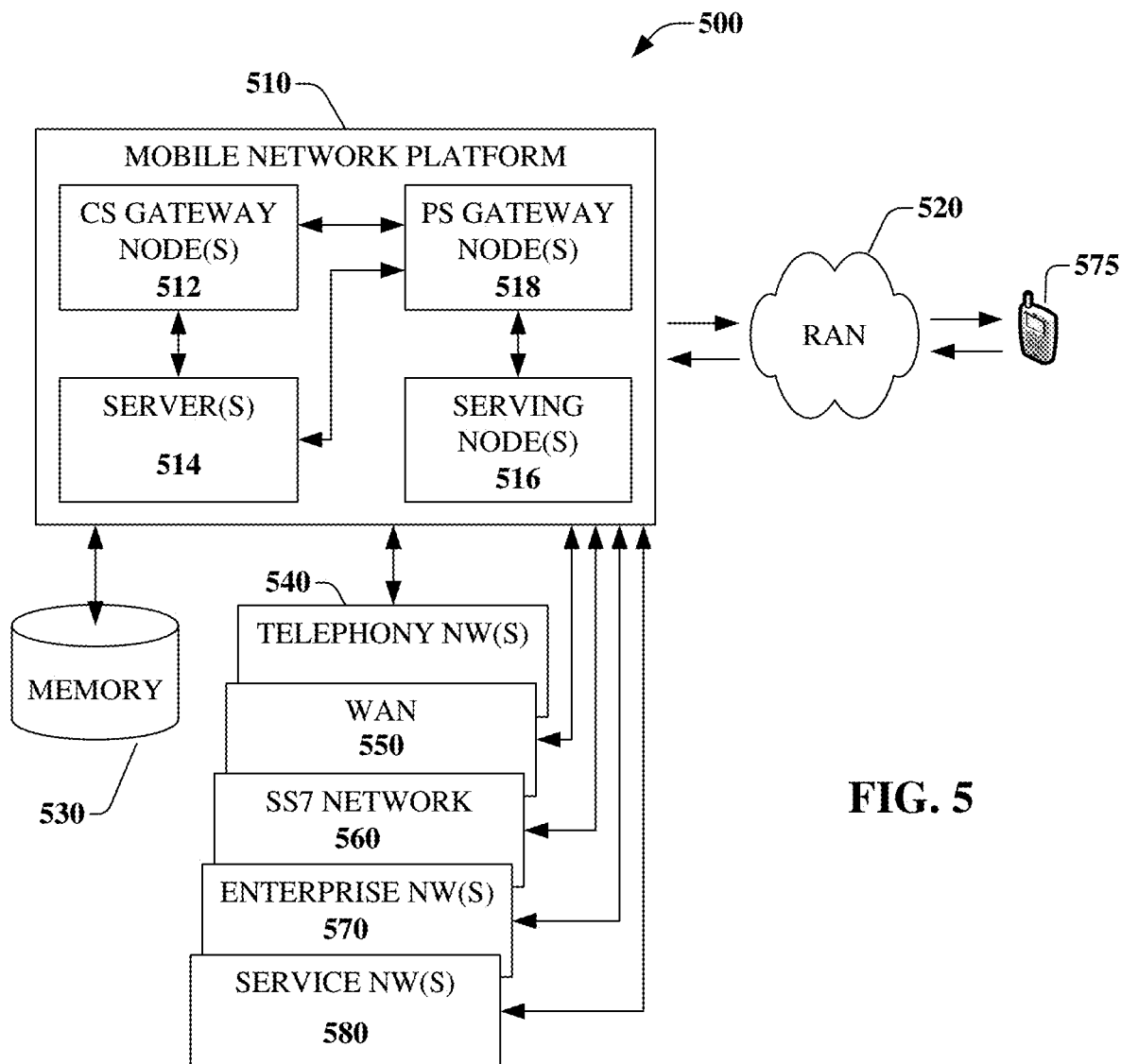
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part in providing an ANLaaS to track which network segments involved in communication of a service are traversed by data of the service as the service is provided, to allow the operator of those network segments to be compensated therefor. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
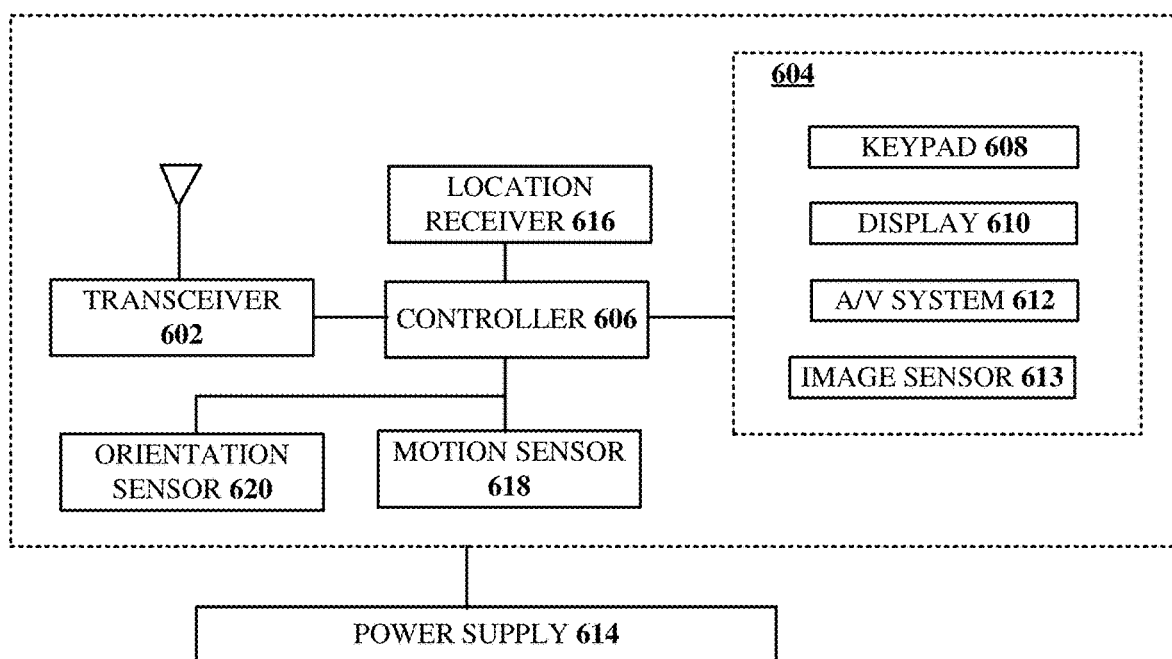
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part in providing an ANLaaS to track which network segments involved in communication of a service are traversed by data of the service as the service is provided, to allow the operator of those network segments to be compensated therefor.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system comprising:
a plurality of accounting nodes, each accounting node of the plurality of accounting nodes being associated with a respective service node of a plurality of network segments used to provide connectivity between an application provider and a user device, wherein at least two network segments of the plurality of network segments are operated by different network service providers, each accounting node configured to collect data usage information for the respective service node; and
a plurality of accounting servers in data communication with accounting nodes of the plurality of accounting nodes, each accounting server of the plurality of accounting servers being configured to receive from the accounting nodes the data usage information for each service node in a respective network segment and determine billing for data usage of each network segment.

2. The system of claim 1, wherein the accounting server comprises:
a processing system including a processor; and
a memory that stores executable instructions that, when executed by the processing system, facilitate performance of operations, the operations comprising:
receiving billing information for an application conveyed on the plurality of network segments; and
determineing billing for data usage for the application on the plurality of network segments.

3. The system of claim 2, wherein the receiving billing information comprises:
receiving information about a time of day the application was used in the plurality of network segments.

4. The system of claim 3, wherein the operations further comprise:
varying pricing for billing for data usage of the plurality of network segments according to the time of day the application is used in the plurality of network segments.

5. The system of claim 2, wherein the receiving billing information comprises:
receiving information about key performance indicators for communication of data of the application conveyed on the plurality of network segments;
receiving information about the application provider associated with the application conveyed on the plurality of network segments; and
receiving information about an application user associated with the application conveyed on the plurality of network segments.

6. The system of claim 5, wherein the operations further comprise:
determining accounting information for data usage of each network segment of the plurality of network segments based on the data usage information and the information about the key performance indicators, the application provider, the application user, or a combination of these; and
writing the accounting information to a secure ledger for reconciling accounts to account for the data usage.

7. The system of claim 2, wherein the operations further comprise:
mapping service nodes and mapping interconnection of the service nodes;
associating accounting nodes with at least some service nodes; and
interconnecting for data communication the accounting nodes and the accounting server to form an accounting network.

8. The system of claim 1, wherein an accounting node of the plurality of accounting nodes comprises:
a processing system including a processor; and
a memory that stores executable instructions that, when executed by the processing system, facilitate performance of operations, the operations comprising:

measuring an amount of data that was consumed or conveyed across the respective service node;

determining accounting information for the data that was consumed or conveyed across the respective service node; and reporting the amount of data and the accounting information to the accounting server.

9. The system of claim 8, wherein the operations further comprise:

providing, by the accounting node to the respective service node, control information to control routing by the respective service node of data associated with a service.

10. The system of claim 9, wherein the operations further comprise:

receiving, from a network operator of the plurality of network service providers, the control information, the control information selected based on billing factors to minimize a cost for data consumed or conveyed across a network segment operated by the network service operator.

11. A method, comprising:

receiving, by a processing system including a processor, network segment data usage information for a plurality of network segments used to provide connectivity between an application provider and a user device, wherein at least two network segments of the plurality of network segments are operated by different network service providers, and wherein the network segment data usage information is collected by accounting nodes associated with respective network segments of the plurality of network segments;

receiving, by the processing system, accounting information, respective accounting information defining cost factors associated with billing for data usage in a respective network segment; and generating, by the processing system, respective billing information for respective network service providers that operate the respective network segments according to the network segment data usage information and the respective accounting information.

12. The method of claim 11, wherein the receiving accounting information comprises:

receiving, by the processing system, time stamp information for use of a service in the network segments;

receiving, by the processing system, service identification information for use of the service in the network segments;

receiving, by the processing system, user identification information for a user of the service in the network segments; and receiving, by the processing system, network service provider information for use of the service in the network segments.

13. The method of claim 12, comprising:

identifying, by the processing system, traversed network segments, of the plurality of network segments, which are traversed during use of the service;

identifying, by the processing system, respective network service operators associated with each respective traversed network segment; and obtaining, by the processing system, compensation for each respective network service operator for use of the traversed network segments during use of the service.

14. The method of claim 12, comprising:

receiving, by the processing system, control information of a network service provider, the control information selected by the network service provider based on billing factors to minimize a cost to the network service provider for data traversing the network segment.

15. The method of claim 14, comprising:

providing, by the processing system, the control information to the accounting nodes associated with respective network segments of the plurality of network segments to control routing of data among the plurality of network segments, each accounting node associated with a service node of the plurality of network segments, each accounting node operative to control an associated service node to control routing of data among the plurality of network segments.

16. A non-transitory machine-readable medium, comprising executable instructions that, when executed by a processing system including a processor, facilitate performance of operations, the operations comprising:

receiving, by the processing system, network segment data usage information for a plurality of network segments used to provide connectivity between an application provider and a user device, wherein at least two network segments of the plurality of network segments are operated by different network service providers, and wherein the network segment data usage information is collected by accounting nodes associated with respective network segments of the plurality of network segments;

receiving, by the processing system, accounting information, respective accounting information defining cost factors associated with billing for data usage in a respective network segment; and generating, by the processing system, respective billing information for respective network service providers that operate the respective network segments according to the network segment data usage information and the respective accounting information.

17. The non-transitory machine-readable medium of claim 16, wherein the receiving accounting information comprises:

receiving, by the processing system, time stamp information for use of a service in the network segments;

receiving, by the processing system, service identification information for use of the service in the network segments;

receiving, by the processing system, user identification information for a user of the service in the network segments; and receiving, by the processing system, network service provider information for use of the service in the network segments.

18. The non-transitory machine-readable medium of claim 17, wherein the operations further comprise:

identifying, by the processing system, traversed network segments, of the plurality of network segments, which are traversed during use of the service;

identifying, by the processing system, respective network service operators associated with each respective traversed network segment; and obtaining, by the processing system, compensation for each respective network operator for use of the traversed network segments during use of the service.

19. The non-transitory machine-readable medium of claim 17, wherein the operations further comprise:

receiving, by the processing system, control information of a network service provider, the control information selected by the network service provider based on billing factors to minimize a cost to the network service provider for data traversing the network segment.

20. The non-transitory machine-readable medium of claim 19, wherein the operations further comprise providing, by the processing system, the control information to the accounting nodes associated with respective network segments of the plurality of network segments to control routing of data among the plurality of network segments, each accounting node associated with a service node of the plurality of network segments, each accounting node operative to control an associated service node to control routing of data among the plurality of network segments.

* * * * *

UNITED STATES PATENT AND TRADEMARK OFFICE
CERTIFICATE OF CORRECTION

PATENT NO. : 12,132,579 B2
APPLICATION NO. : 17/969167
DATED : October 29, 2024
INVENTOR(S) : Howard L. Lang and Joseph Soryal It is certified that error appears in the above-identified patent and that said Letters Patent is hereby corrected as shown below:

In the Claims

Claim 2: Column 32, Line 20, delete "determineing", insert --determining--

Signed and Sealed this
Eleventh Day of February, 2025

Coke Morgan Stewart
*Acting Director of the United States Patent and Trademark Office*